United States Patent
Schmidt et al.

(10) Patent No.: US 9,086,080 B2
(45) Date of Patent: Jul. 21, 2015

(54) DEVICE FOR DETERMINING AN OPERATING STATE OF AT LEAST ONE BIDIRECTIONALLY ACTUABLE HYDRAULIC ADJUSTING DEVICE OF A SHIFTING ELEMENT OF A TRANSMISSION DEVICE

(75) Inventors: Thilo Schmidt, Meckenbeuren (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 416 days.

(21) Appl. No.: 13/695,310

(22) PCT Filed: Apr. 4, 2011

(86) PCT No.: PCT/EP2011/055156
§ 371 (c)(1),
(2), (4) Date: Oct. 30, 2012

(87) PCT Pub. No.: WO2011/138102
PCT Pub. Date: Nov. 10, 2011

(65) Prior Publication Data
US 2013/0047739 A1 Feb. 28, 2013

(30) Foreign Application Priority Data
May 7, 2010 (DE) .......................... 10 2010 028 762

(51) Int. Cl.
*F15B 15/28* (2006.01)
*F15B 15/14* (2006.01)
(Continued)

(52) U.S. Cl.
CPC ............ *F15B 15/2838* (2013.01); *F16H 59/68* (2013.01); *F16H 61/30* (2013.01); *F15B 15/149* (2013.01); *F15B 2211/6306* (2013.01); *F16H 2059/683* (2013.01); *F16H 2061/283* (2013.01)

(58) Field of Classification Search
CPC ............... F15B 15/149; F15B 15/2838; F15B 2211/6306; F16H 59/68; F16H 61/12; F16H 61/30; F16H 2059/683; F16H 2061/126; F16H 2061/1264; F16H 2061/1288; F16H 2061/283

USPC ............... 73/1.71, 115.02, 168; 74/473.11, 74/DIG. 1, DIG. 7; 474/273; 475/158; 476/12; 477/163
See application file for complete search history.

(56) References Cited

U.S. PATENT DOCUMENTS 4,324,156 A * 4/1982 Iwanaga et al. ............... 477/136
4,488,456 A * 12/1984 Taga et al. ................. 477/163 X
(Continued)

FOREIGN PATENT DOCUMENTS

DE          42 20 333 A1    12/1993
DE     10 2006 030 034 A1    1/2008
(Continued)

OTHER PUBLICATIONS

German Search Report Corresponding to DE 10 2010 028 762.8, with partial English translation of the paragraph with the heading Spalte: Kat (egorie) on p. 4.
(Continued)

*Primary Examiner* — Thomas P Noland
(74) *Attorney, Agent, or Firm* — Davis & Bujold, P.L.L.C.; Michael J. Bujold

(57) ABSTRACT

A device for determining an operating state of a bi-directionally actuated hydraulic adjusting device of a transmission shifting element, which pressurizes active surfaces of a piston. The piston is biased to opposite end positions depending on which of a first active surface or a second active surface is pressurized with high pressure. The areas of the adjusting device, which can be pressurized with the pressure at the active surfaces of the piston, are connected with one another in positions of the piston element, between the end positions, via a throttle device. One of each area can be coupled for adjustment of the piston with the high-pressure area, and the other area with the low pressure area. An additional throttle device is provided upstream of the low pressure area and a pressure measuring device is provided upstream of the additional throttle device.

14 Claims, 10 Drawing Sheets

(51) Int. Cl.
*F16H 59/68* (2006.01)
*F16H 61/12* (2010.01)
*F16H 61/30* (2006.01)
*F16H 61/28* (2006.01)

(56) References Cited

U.S. PATENT DOCUMENTS

| | | | | |
|---|---|---|---|---|
| 5,527,233 | A | * | 6/1996 | Tabata et al. .... F16H 2061/1264 |
| 5,836,845 | A | * | 11/1998 | Sakaguchi et al. ...... F16H 61/12 |
| 6,682,451 | B1 | * | 1/2004 | Luh et al. ................ F16H 61/12 |
| 6,694,803 | B2 | | 2/2004 | Klik et al. |
| 6,705,175 | B1 | | 3/2004 | Klatt |
| 6,735,509 | B2 | * | 5/2004 | Watanabe et al. ................ 701/62 |
| 7,033,297 | B2 | * | 4/2006 | Nozaki et al. ................. 475/129 |
| 7,255,212 | B2 | * | 8/2007 | Morise et al. ........... F16H 61/12 |
| 7,347,117 | B2 | | 3/2008 | Nassif |
| 7,374,512 | B2 | * | 5/2008 | Ayabe et al. ................. 477/133 |
| 7,568,996 | B2 | * | 8/2009 | Matsui et al. ................... 477/46 |
| 8,175,777 | B2 | * | 5/2012 | Shimizu et al. ................ 701/51 |
| 8,271,170 | B2 | * | 9/2012 | Fukaya et al. ................. 701/68 |
| 8,942,883 | B2 | * | 1/2015 | Dlugoss et al. ......... F16H 59/68 |
| 2009/0203480 | A1 | | 8/2009 | Petzold et al. |
| 2011/0137515 | A1 | | 6/2011 | Steinborn et al. |

FOREIGN PATENT DOCUMENTS

| | | | | |
|---|---|---|---|---|
| DE | 10 2008 041 399 | A1 | 2/2010 | |
| EP | 1 067 319 | A2 | 1/2001 | |
| EP | 1 270 954 | A2 | 1/2003 | |
| EP | 1 621 777 | A2 | 2/2006 | |
| JP | 03121363 | A * | 5/1991 | .................... 477/159 |
| JP | 03172545 | A * | 7/1991 | .................... 123/350 |
| JP | 03172546 | A * | 7/1991 | ............. F16H 61/12 |
| JP | 03172548 | A * | 7/1991 | .................... 123/319 |
| JP | 2805711 | B2 * | 9/1998 | ............. F16H 59/68 |
| JP | 2005195042 | A * | 7/2005 | ............. F16H 61/12 |
| JP | 2006017247 | A * | 1/2006 | ............. F16H 59/68 |

OTHER PUBLICATIONS

International Search Corresponding to PCT/EP2011/055156, mailed Jun. 21, 2011.
Written Opinion Corresponding to PCT/EP2011/055156, with English translation of paragraphs 2-2.3 on p. 4.

* cited by examiner

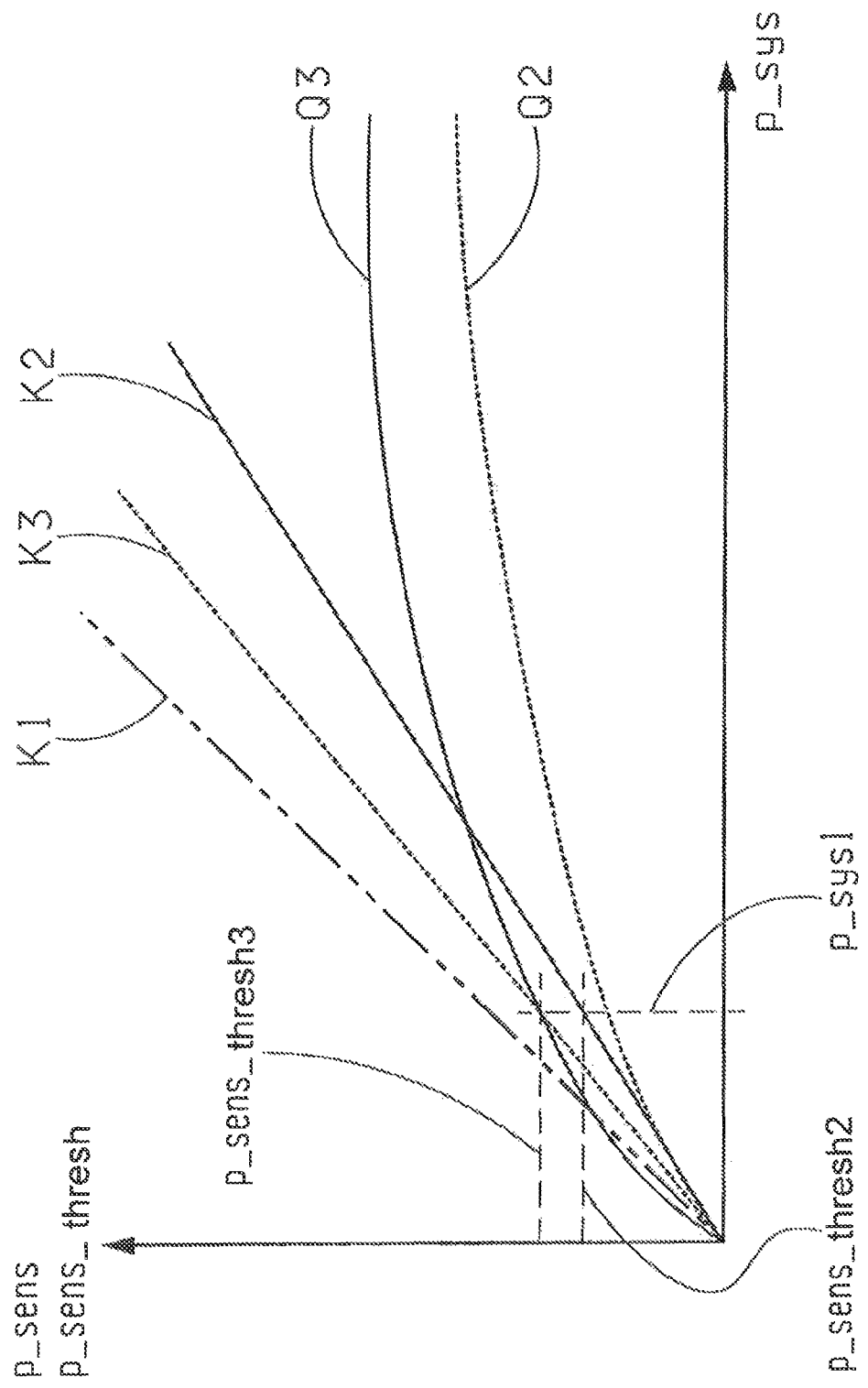

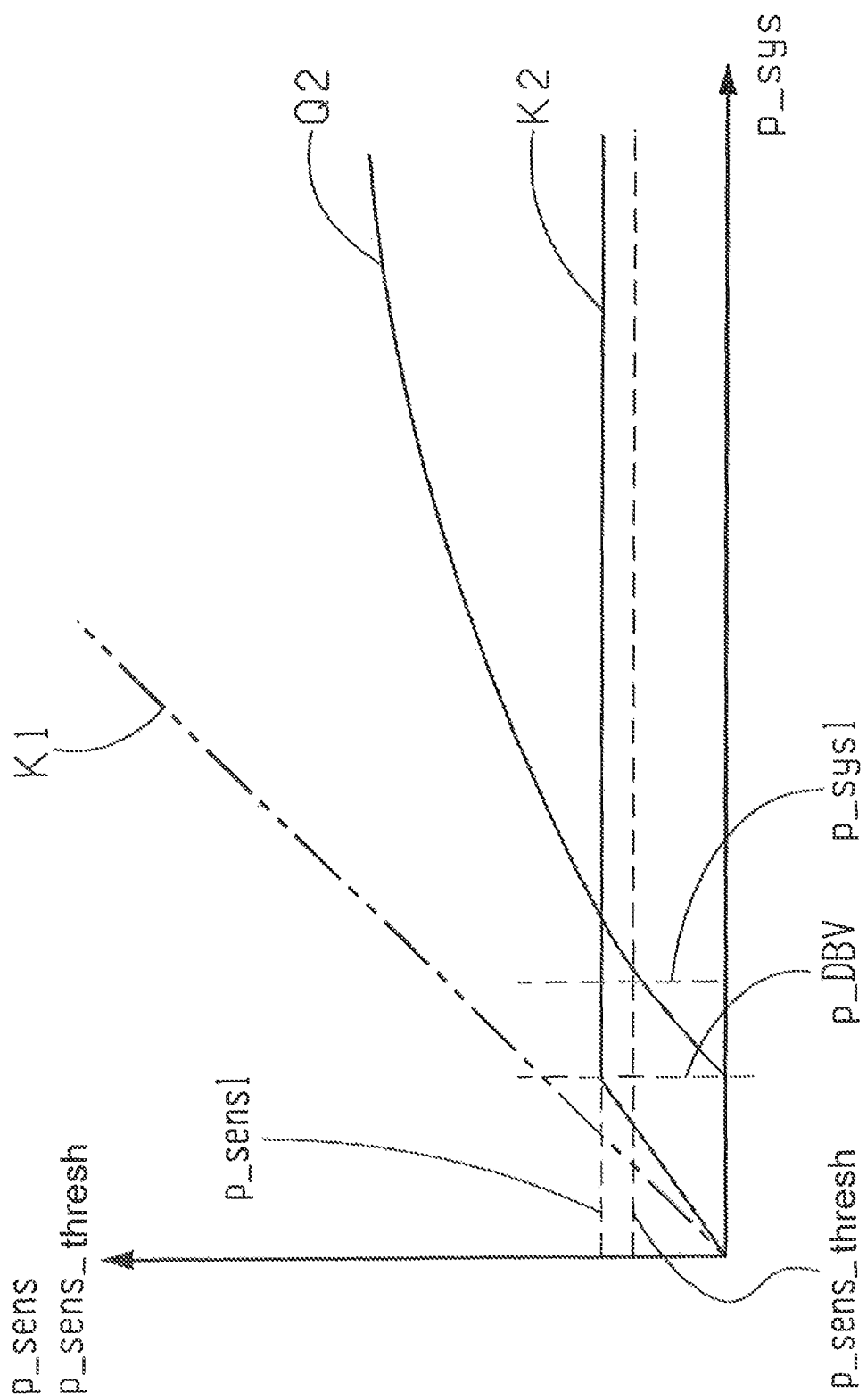

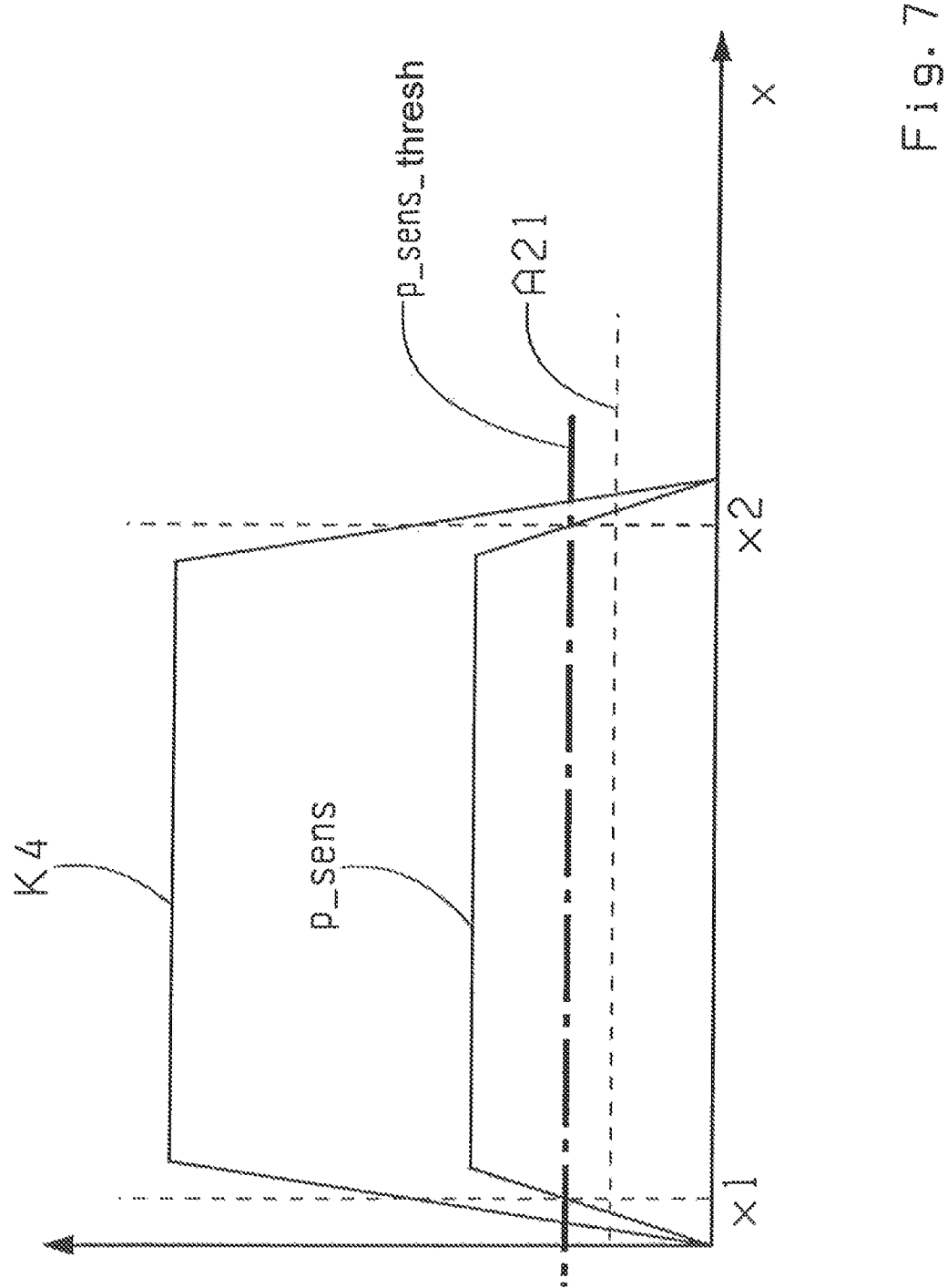

DEVICE FOR DETERMINING AN OPERATING STATE OF AT LEAST ONE BIDIRECTIONALLY ACTUABLE HYDRAULIC ADJUSTING DEVICE OF A SHIFTING ELEMENT OF A TRANSMISSION DEVICE

This application is a National Stage completion of PCT/EP2011/055156 filed Apr. 4, 2011, which claims priority from German patent application serial no. 10 2010 028 762.8 filed May 7, 2010.

FIELD OF THE INVENTION

The invention concerns a device for determining an operating state of at least one bidirectionally actuable hydraulic adjusting device of a shift element in a transmission device.

BACKGROUND OF THE INVENTION

Because machinery and vehicles present during their life cycle, meaning from the manufacturing to the disassembly, a possible danger for mankind, machinery or vehicle, respectively, and the environment, these hazards are ascertained during the design phase and attempts are made through appropriate actions to reduce the same. Hereby, the overall safety of a machine or vehicle, respectively, describes the condition which does not present any unjustifiable risks for mankind or is considered as no danger. The term functional safety describes, however, a part of the overall safety of a system which is dependent of the concrete function of the safety related systems and external devices for risk reduction.

The parts of machinery or vehicle controls which are responsible for safety tasks are marked by international norms as safety related parts or controls. These parts can comprise of hardware or software and can be a separate or integral part of the machine control or vehicle control, respectively. Safety related control parts each incorporate the entire reaction chain of a safety function, comprising of an input-level, such as a sensor, the logic, meaning a safe signal processing, and the output-level, which is for instance realized through an actuator.

It is the common goal to design these control parts in such a way that the safety of the control function, as well as the behavior of the control in case of a malfunction, corresponds to the level of risk reduction which was determined in a risk assessment.

To monitor the function of bidirectional actuated hydraulic shift elements, such as clutch pistons or control pistons, the state of the art uses in known transmission devices constructively sophisticated distance sensor configurations or pressure sensor configurations, respectively. Hereby, the distance sensors which are used are either very expensive analog sensors or at least end position switches are implemented. The application of such distance sensors or end position switches increases the constructive complexity of a transmission device, because the position of a clutch piston in a transmission device, for instance, can only be determined directly at its location, meaning directly in the area of the respective transmission part.

If the function of rotating transmission parts, which are in operation in a transmission device, need to be monitored, a device to determine the operating condition has to be at least partially designed with a telemetric data measuring device, which would be disadvantageous in a series production due to high cost.

SUMMARY OF THE INVENTION

It is therefore the task of the present invention to provide a cost-effective and constructively simple device that determines the operating condition of at least one bi-directionally actuated hydraulic adjustment device of a shift element in a transmission device.

In the inventive device for determining and operating state of at least one bi-directionally actuated hydraulic adjustment device of a shifting element in a transmission device, which each can be used with hydraulic pressure in the active surface area of a piston element, an actual force component works at the piston element when a hydraulic pressure of a high-pressure area is applied in the area of a first active surface, in the direction of a first end position of the piston element, and when a hydraulic pressure of the high-pressure area is applied to a second active surface, a force component engages in the direction of the second end position of the piston element.

In accordance with the invention, the assigned areas of the adjusting device and its active surfaces of the piston element, in positions of the piston elements between the end positions, are connected with each other through a throttle device, whereby in each case one of the areas can be coupled with the high-pressure area to adjust the piston element, and the other area can be coupled with the low pressure area. In addition, another additional throttle device is provided upstream of the low pressure area and again, upstream of the additional throttle device, a pressure measurement device is provided.

In comparison to the known state of the art embodiments for the functional monitoring of bidirectional actuated hydraulic adjustment devices, such as clutch pistons or control pistons, the inventive device can be constructed simpler and less expensive because sensing of the position of a control or clutch piston can be accomplished by means of a simple pressure sensor or a pressure switch, respectively, which is ideally positioned directly in the hydraulic actuator and not immediately in the area of the part which has to be monitored.

The characteristics in the following embodiment examples of the inventive device can either by themselves or in any given combination be used to expand the invented matter. The respective combinations of the feature are not limited in regard to a further development of the matter of the invention, but are merely exemplary in nature.

BRIEF DESCRIPTION OF THE DRAWINGS

Further advantages and advantageous embodiments of the inventive hydraulic system will become apparent from the claims and the following with reference to the drawings, in principle with the embodiments described, whereby for reasons of clarity the same reference characters are used in the description for the same functional parts.

It shows:

FIG. 5 a characteristic of a developing jamming pressure in the area of a throttle device, depending on a pressure of a high-pressure area or depending on the piston elements of the adjustment device and its piston elements of the adjustment devices which are not in the end position, in accordance with FIG. 1;

FIG. 6 a presentation as in FIG. 5, concerning the device in accordance with FIG. 3;

FIG. 7 a general, graphic presentation of the travel dependent leakage of the hydraulic adjustment devices and its derived, safe recognition of an end or interim position of the piston elements of the adjustment devices of the inventive device;

DETAILED DESCRIPTION OF THE PREFERRED EMBODIMENTS

Figure 1:
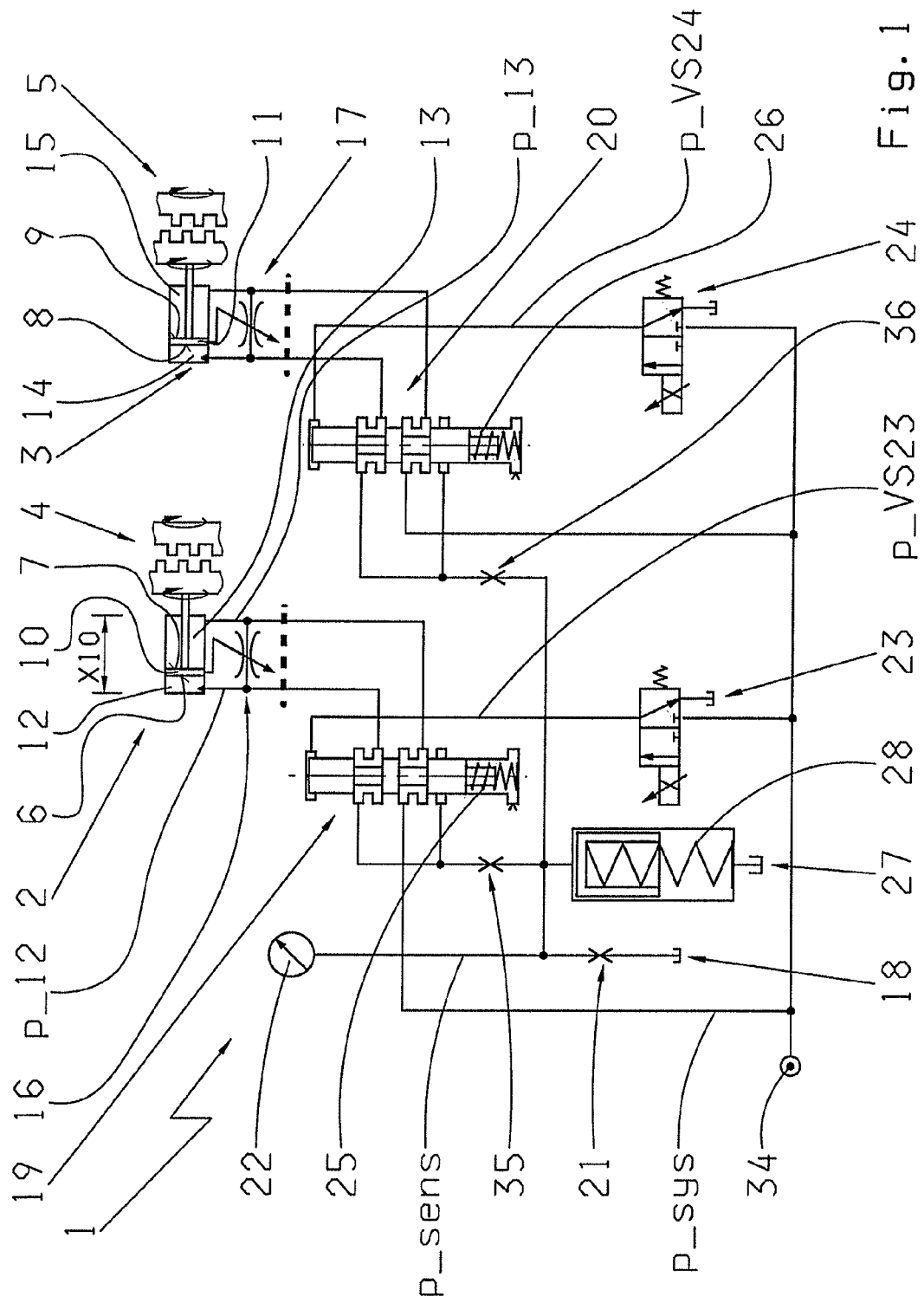
FIG. 1 a hydraulic diagram of a device to determine an operating condition of two, bi-directionally operating hydraulic adjustment devices of shifting elements of a transmission device.

FIG. 1 shows a hydraulic diagram of a device 1 for determining the operating condition of two bi-directionally actuated hydraulic adjustment devices 2, 3 of shifting elements 4, 5, in this case claw shifting elements, whereby the shifting elements 4, 5, dependent on the respective application, can also be designed as frictional shifting elements such as multi-plate clutches or brakes. The adjusting devices 2, 3 can each be provided in the area of the active surfaces 6, 7 or 8, 9 of a piston element 10, 11 with hydraulic pressure.

If a hydraulic pressure p_sys of a high pressure area 34 in the area of a first active surface 6 or 8 is present at the piston element 10 or 11, a power component occurs in the direction of the first end position of the piston element 10 or 11. If the hydraulic pressure p_sys of the high-pressure area 34 is, however, present at the second active surface 7 or 9 of the piston element 10 or 11, a power component occurs in the direction of a second end position of the piston element 10 or 11.

The areas 12, 13 or 14, 15, respectively, or piston chambers which can be provided with the hydraulic pressure p_sys and which are assigned to the active surfaces 6, 7 or 8, 9, respectively, of the piston elements 10 or 11, respectively, are in positions of the piston elements 10, 11, between the end positions, are each connected with each other through a throttle device 16 or 17, respectively. In addition, one of each of the areas 12 or 13, or rather 14 or 15 can be coupled with the high-pressure area 34 to adjust the piston element 10 or 11, and each of the other areas 13 or 12, or rather 15 or 14, respectively, can be coupled with the low pressure area 18. Hereby, two valve devices 19, 20 are provided, wherein their areas the piston chambers 12, 13 or 14, 15, respectively, can each be coupled with either the high-pressure area 34 or the low pressure area 18.

Upstream of the low pressure area 18 and downstream of the valve devices 19, 20, an additional throttle device 21 is provided, and a pressure measuring device 22 is provided upstream of the valve devices 19, 20. The valve devices 19, 20, in this case designed as 4/2-way control valves can each be provided, in here through an actuator 23 or 24, respectively, which is designed as a magnetic valve, against a spring device 25 or 26, respectively, with a control pressure p_VS23, p_VS24, to provide the adjusting devices 2, 3, as required, in the area of the piston chambers 12 and 13, or in the area of the piston chambers 14 and 15, respectively, with the hydraulic pressure p_sys of the high-pressure area 34, or to connect them with the low pressure area 18.

Due to the fact that one single pressure measuring device 22 is provided for the monitoring the position of the two piston elements 10 and 11, baffles 35, 36 are provided between the hydraulic storage 27 and the valve devices 19 and 20 between the pressure limiting valve 33 and the valve devices 19 and 20, which eliminate a mutual influence of the actuator pistons 10 and 11 during actuation.

Via the pressure measuring device 22, which comprises a simple pressure sensor or pressure switch, respectively, an end position sensing of the positions of the piston elements 10, 11 can be executed. In addition, the position sensing is ideally provided in the area of the hydraulic control, where all end positions of the piston elements 10 and 11 can be determined by means of a single pressure sensor in the manner described in detail below.

Figure 2:
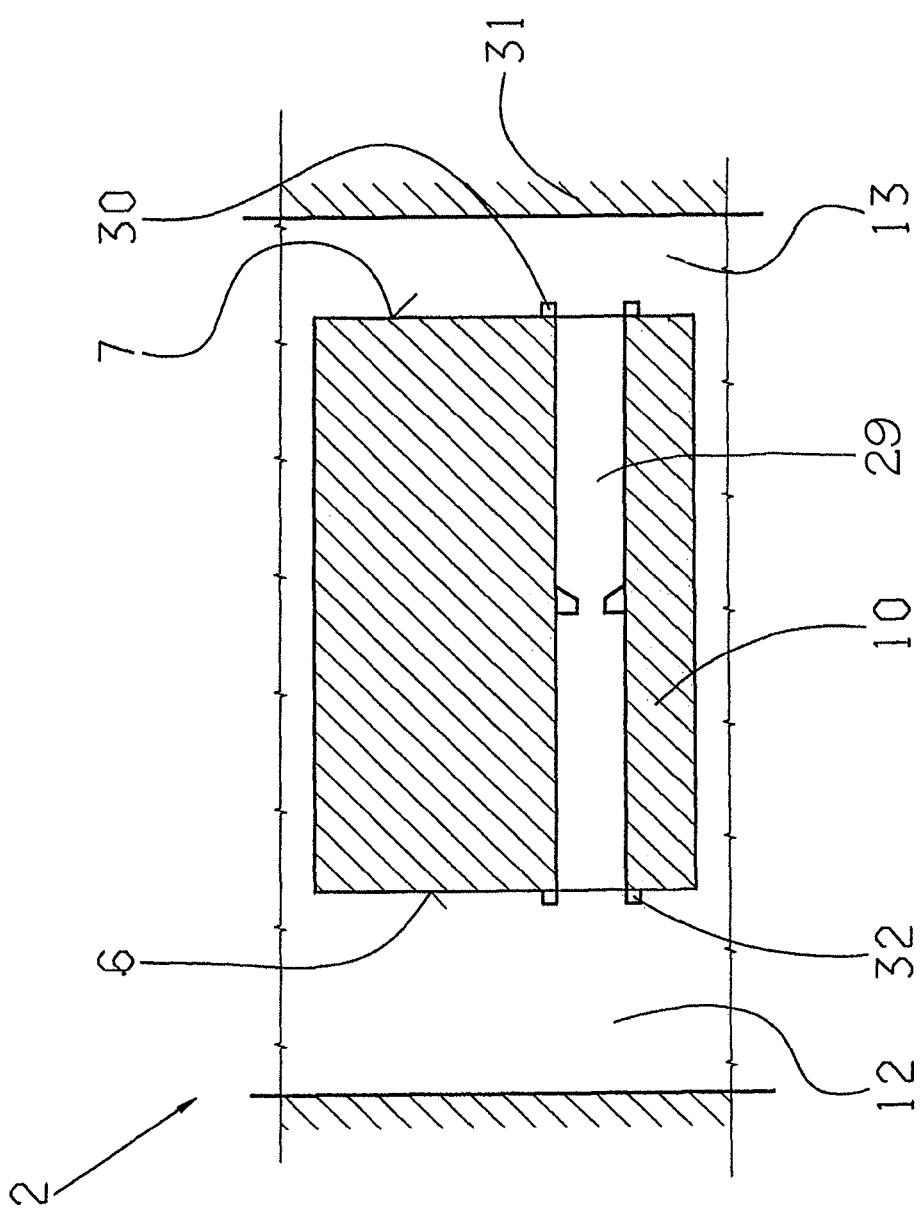
FIG. 2 an enlarged detailed view of a piston element of an adjustment device in accordance with FIG. 1.

Between the two end positions of the piston elements 10 and 11, the piston chambers 12 and 13 or 14 and 15, respectively are via the throttle devices 16 and 17 position dependent connected with each other, whereby the throttle devices 16 and 17 can be designed in accordance with FIG. 2 and the present range.

The throttle devices 16 and 17 or the connections, respectively, between the piston chambers 12 and 13, or 14 and 15, respectively, in the area of the throttle devices 16 and 17, are always released by the piston elements 10 and 11 at the time when the piston elements 10 and 11 are not in their end positions.

Hereby, via the throttle devices 16 and 17, in positions of the piston elements 10 and 11 between their end positions, a hydraulic fluid volume stream, starting at the piston chamber 12 or 13, or rather 14 or 15, which is connected with the high-pressure area 34 via the valve device 19 or 20, brought into the direction of the piston chamber 13 or 12, or rather 15 or 14, which is coupled with the low pressure area 18, which is here the transmission sump of the transmission device.

In the area of an additional throttle device 21 which presents a throttle aperture, a throttle pressure p_sens establishes itself, dependent of the throttle cross section of the additional throttle device 21, depending of the leakage flow from the piston chamber 12 or 13, or rather 14 or 15 in the direction of the low pressure area 18, and which can be calculated in the area of the pressure measuring device 22 through a technical measurement.

In addition and upstream of the additional throttle device 21, a hydraulic storage 27 is provided, which is here designed as a spring-piston storage and which can also be designed, dependent of the application, in any suitable configuration of a hydraulic storage. The storage volume of the hydraulic storage 27 matches at least closely the hydraulic fluid volume which is displaced during a movement of the piston element 10 or 11, starting from one end position into another end position of the piston element 10 or 11. It has to be taken into account that, in the case of different amounts of displaced hydraulic fluid volume, the storage volume of the hydraulic storage 27 needs to match the largest displaced hydraulic fluid volume, so that the following described function of the device 1 can be provided in its entirety in a simple manner.

The hydraulic storage 27 can be completely filled, below a prior defined pressure threshold p_sens_thresh, at which, via the pressure measuring device 22, a malfunction is identified in the area of the adjusting device 2 or 3, respectively. This determines the spring force of a spring device 28 of the hydraulic storage 27, or that hereby the resulting dynamic actuating pressure of the hydraulic storage 27, which acts as a volume damper, is lower than the pressure threshold p_sens_thresh of the pressure measuring device 22, or to dimension it as the diagnostic threshold.

If the piston element 10 or 11, based on a respective request, is brought from one end position into another end position, the hydraulic fluid which is displaced from the piston chamber 12 or 13, or rather 14 or 15, is discharged into the non-filled hydraulic storage 27, via the valve device 19 or 20 initially against the spring force of the spring device 28, then, upstream of the valve device 19 and the valve device 20 and during the filling of the hydraulic storage 27, no noticeable throttling pressure p_sense is created and a reduction of the movement speed of the piston element 10 or 11, respectively, does not take place.

When the piston element 10 or 11 reaches its requested end position, the throttle device 16 or 17, respectively, will be shut by the piston element 10 or 11, respectively, and the leakage volume flow, starting at the piston chamber 12 or 13, or rather 14 or 15, which is connected with the high-pressure area 34 via the valve device 19 or 20, in the direction of the piston chamber 13 or 12 or rather 15 or 14, which is connected with the low pressure area 18 via the valve device 19 or 20, is interrupted. It causes, downstream of the valve device 19 or 20, respectively, in the direction of the low pressure area 18, that the hydraulic pressure diminishes and that the hydraulic storage 27, due to the spring device 28, is emptied in the direction of the lower pressure area 18 with increasing duration of the operation. During that operating condition of the device 1, no diagnosable pressure value is present at the pressure measuring device 22.

If the piston element 10 is not in its desired end position the actuation, then active leakage volume flow, that is continuously present, causes in the area of the non-blocked throttle device 16 a complete filling of the hydraulic storage 27. When the hydraulic storage 27 is completely filled, a very fast rise of the throttling pressure p_sens takes place upstream at the additional throttle device 21 which can be diagnosed in the area of the pressure measuring device 22.

FIG. 2 shows a highly schematic presentation of the piston element 10 of the adjusting device 2 in an interim position in which the piston chamber 12 is connected with the piston chamber 13 via a provided throttle borehole 29 in the piston element 10. In the first end position of the piston element 10 in which the volume of the piston chamber 13 is minimal, the piston element 10 with its sealing device 30 makes close contact at a cylinder wall 31 of the adjusting device 2, thus closing hereby the throttle borehole 29 in this area and the connection between the piston chambers 12 and 13 is separated. In the second end position of the piston element 10, in which the volume of the piston chamber 12 is minimal, the piston element 10 makes close contact with an additional sealing device 32 also at the cylinder wall 31 and the throttle borehole 29 is sealed, whereby the piston chambers 12 and 13 are again separated from each other.

Figure 3:
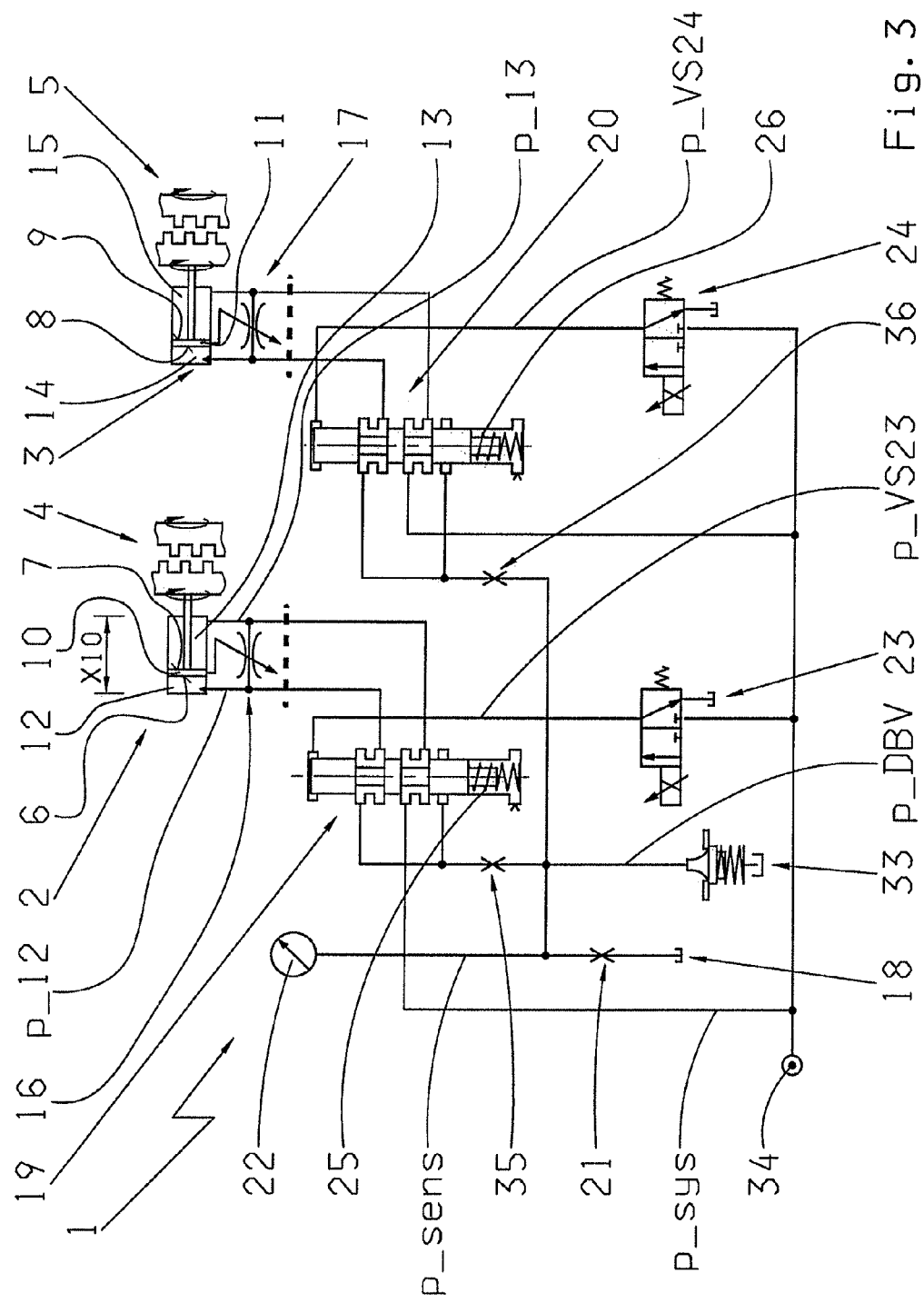
FIG. 3 a presentation of a second embodiment example of the inventive device shown in FIG. 1.

A second embodiment example of the inventive device 1 is shown in FIG. 3, which matches mainly the device 1 in accordance with FIG. 1, but instead of the hydraulic storage 27 downstream of the valve device 19 and 20, and upstream of the additional throttle device 21, it is designed with a pressure limiting valve 33. In the following description of the device 1 in accordance with FIG. 3, essentially only the differences of the device 1 in accordance with FIG. 1 are discussed and, with reference to the functionality of the device 1 in accordance with FIG. 3, are further referred to the description in FIG. 1 and FIG. 2.

The triggering pressure p_DBV of the pressure limiting valve 33 resides above the predefined pressure threshold p_sens_thresh of the pressure measuring device 22 at which, via the pressure measuring device 22, a malfunction in the area of the adjusting device 2 or 3, respectively, is identified. Due to the positioning of the pressure limiting valve 33, upstream of the additional throttle device 21, the pressure, downstream of the valve devices 19 and 20 and upstream of the additional throttle devices 21 during the actuation of the piston elements 10 or 11, respectively, rises to at least the triggering pressure p_DBV of the pressure limiting valve 33. After the piston elements 10 or 11, respectively, have reached the end position, the leakage volume flow in the area of the throttle device 16 or 17, respectively, is interrupted through the piston element 10 or 11 in the previously described manner, whereby the hydraulic pressure p_sens, upstream of the additional throttle device 21, cannot again reach the pressure level of the triggering pressure p_DBV of the pressure limiting valve 33. This results from the fact that the hydraulic system, upstream of the valve devices 19 and 20, is vented via the additional throttle device 21 in the direction of the low pressure area 18.

If the piston element 10 does not reach the intended end position, the leakage volume flow, via the throttle device 16, remains large and causes an increase of the pressure until, in the area of the throttling device 21, the pressure limiting valve 33 triggers and it limits the pressure p_sens in the system. The throttling pressure p_sense in the tank pipe, which has the additional throttling device 21, increases hereby to a level so that in the area of the pressure measuring device 22, the pre-defined pressure threshold p_sens_thresh is exceeded and the electronic transmission control device receives a signal which relates to a faulty piston position.

Figure 4:
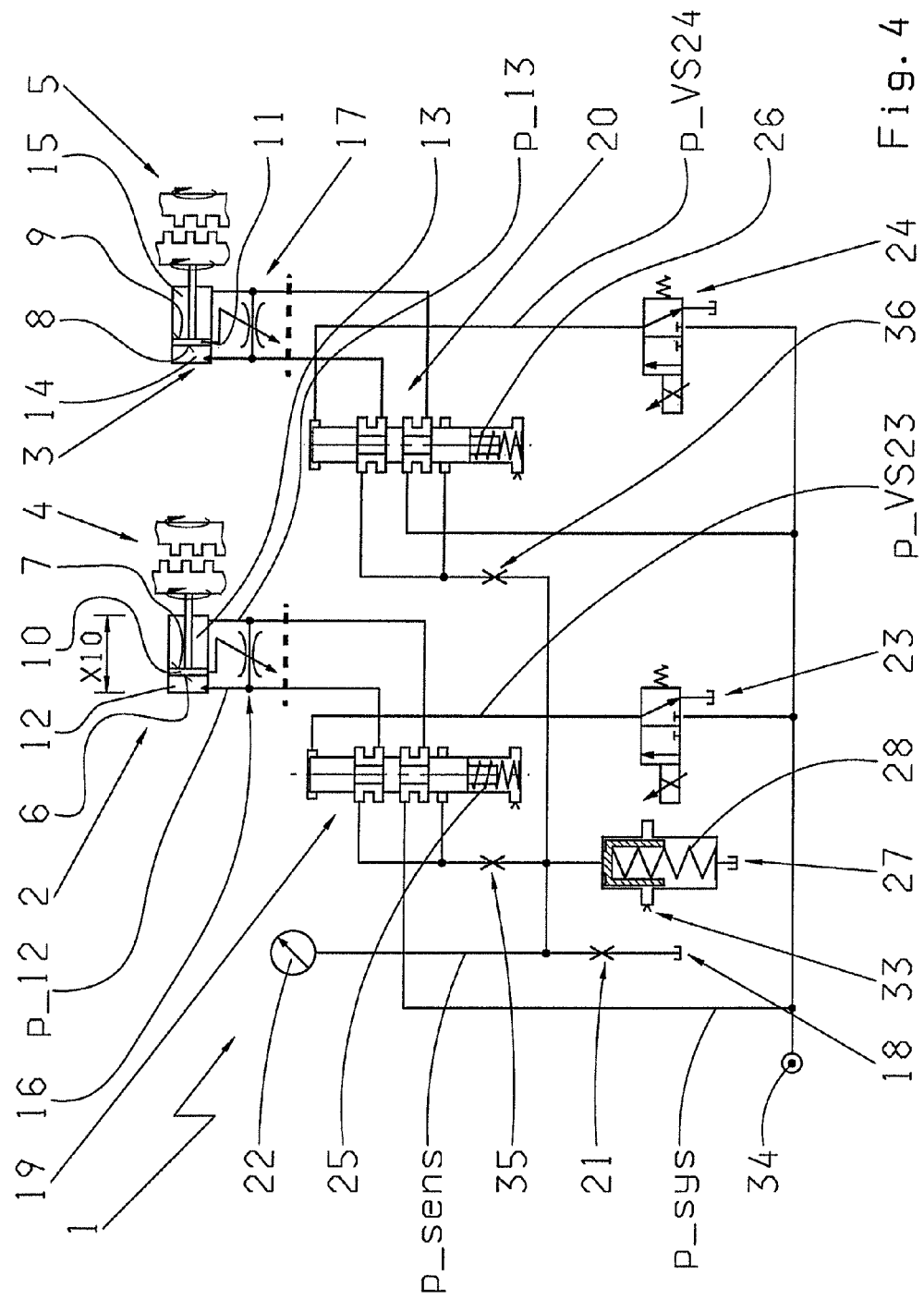
FIG. 4 a presentation of a third embodiment example of the inventive device shown in FIG. 1.

FIG. 4 shows a third embodiment example of the device 1 which has a combination of the hydraulic storage 27 and the pressure limiting valve 33 in the area between the additional throttle device 21 and the valve devices 19 and 20. Otherwise, the device 1 according to FIG. 4 essentially matches the devices 1 in FIG. 1 and FIG. 3, and therefore, with respect to the other functions of the device 1 according to FIG. 4 reference is made to the description in FIG. 1 to FIG. 3.

FIG. 5 shows the dependence of the pressure threshold p_sense_thresh of the pressure measuring device 22 or the created throttling pressure p_sense in the area of the additional throttle device 21 of the hydraulic pressure p_sys of the high-pressure area 34 in positions of the piston elements 10 and 11 between the end positions while simultaneously monitoring both adjusting devices 2 and 3 with just one pressure measuring device 22. A first characteristic curve K1 shows the dependence of the pressure threshold p_sens_thresh on the hydraulic pressure p_sys of the high-pressure area 34 and a throttle cross section of the additional throttle device 21 that is equal to zero, whereby the gradient of the characteristics curve K1 is equal to 1. The gradient of a characteristic curve K3 relates to the area ratio between the throttle area of the throttle device 17, which is assigned to the adjusting device 3, and the throttle area of the additional throttle device 21, which is here approximately 0.7. The gradient of an additional characteristic curve K2 relates to an area ratio between the throttle area of the throttle device 16, which is assigned to the adjusting device 2, and the throttle area of the additional throttle device 21, which is here mainly equal to 0.5. Due to the area ratio as basis in the curve K3, positions of the piston element 11 between its end positions cause the creation of a hydraulic fluid volume flow Q3, depending on the hydraulic pressure p_sys of the high-pressure area 34, while a hydraulic fluid volume flow Q2 is created which is dependent of the area ratio, as the basis of K2, between the throttle devices 16 and 21.

Due to the different area ratios between the throttle device 16 and the additional throttle device 21 or between the throttle device 17 and the additional throttle device 21, respectively, it creates in the area of the additional throttle device 21 an exemplarily selected hydraulic pressure level p_sys1 of the high-pressure area 34 in the area of the pressure measuring device 22 during an actuation of the adjusting device 2, a pressure threshold p_sens_thresh2, and for the adjusting device 3 a larger pressure threshold p_sens_thresh3, each of which can be identified by an intersection between the vertical line through the pressure value p_sys1 of the pressure p_sys of the high-pressure area 34 and the characteristics curve K2 or the characteristics curve K3, respectively.

That means that due to the dependence of different area ratios between the throttle devices 16 and 21 or rather 17 and 21, and the resulting, different pressure thresholds p_sens_thresh2 or rather p_sens_thresh3, in the area of the additional throttle device 21, different pressure levels, which are defined and assigned to the adjusting devices 2 and 3, can be monitored via the pressure measuring device 22.

FIG. 6 shows a presentation, related to FIG. 5 of the device 1, in accordance with FIG. 3, in which a differentiation between the adjusting devices 2 and 3 in the area of the pressure measuring device 22 cannot be performed in the manner as in FIG. 5. It results from the fact that, above the triggering pressure p_DBV of the pressure limiting device 33, the throttling pressure p_sens in the area of the additional throttle device 21 matches the triggering pressure p_DBV of the pressure limiting valve 33 and thus, two pressure thresholds in the area of the pressure measuring device 22 cannot be presented.

The characteristic curve in accordance with FIG. 6 results when the diameter of the throttle aperture of the additional throttle device 21 is equal to zero, while the characteristic curve K2 is a result of the dependence of the area ratio between the throttle device 16 and the additional throttle device 21. That characteristic curve K2 has initially a respective gradient which relates to the characteristic curve K2 in accordance with FIG. 5. When the triggering pressure p_DBV of the pressure limiting valve 33 is reached, the gradient of the characteristic curve K2 equals zero, because the pressure p_sens, upstream of the additional throttle device 21 in the area of the pressure limiting valve 33, is limited to the triggering pressure p_DBV. The trend of the hydraulic fluid volume flow Q2 is initially zero and increases, when reaching the triggering pressure p_DBV of the pressure limiting valve 33, in the manner as shown in FIG. 6. The predefined pressure threshold p_sens_thresh of the pressure measuring device 22, and from where, via the pressure measuring device 22, a pressure malfunction in the area of the adjusting device 2 or 3 is determined as described in the following manner, is here lower than the pressure p_sense1 which, when reaching the triggering pressure p_DBV of the pressure limiting valve 33, is present in the area of the pressure measuring device 22.

A diagram as shown in FIG. 7 illustrates the functional relationship between the piston element dependent leakage in the area of the adjusting device 2 and 3 of the inventive device 1, through which position monitoring of the piston elements 10 and 11 can be performed and the required manner. A characteristic curve K4 shows here a qualitative dependence between the throttle area of the throttle device 16 or 17, respectively, over an actuating distance x of the piston element 10 or 11, respectively. It shows in addition, each depending on the actuating distance x of the piston element 10 or 11, respectively, in the area of the pressure measuring device 22, the present pressure p_sens, the predefined pressure threshold p_sens_thresh and the throttle area A_21. Below a first actuating distance value x1 and above a second actuating distance value x2 and in the area of the pressure measuring device 22, in each case a first end position or second end position, respectively, of the piston element 10 or 11, respectively, is identified, because the sensor pressure p_sens is lower than the diagnosis threshold value or predefined pressure threshold p_sens_thresh, respectively.

Figure 8A:
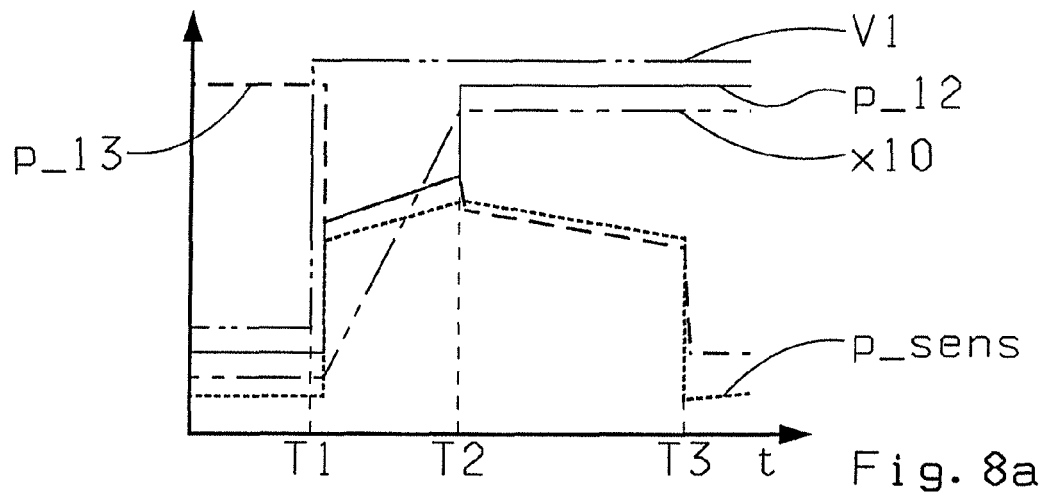
FIG. 8a several operating condition trends of the device in accordance with FIG. 1 during actuation of the piston element of the first adjustment device, whereby the piston element has been shifted from its first end position completely into its second end position.
Figure 8B:
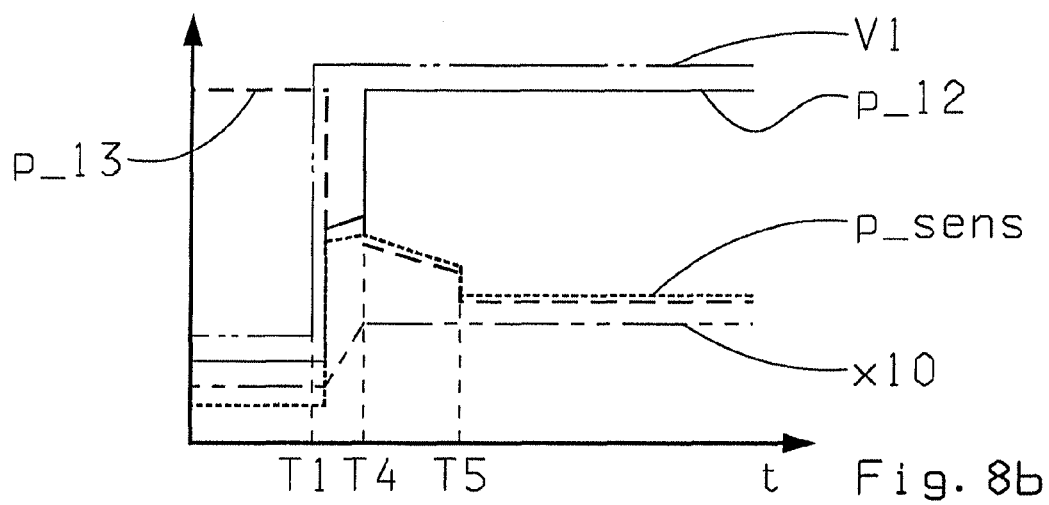
FIG. 8b a presentation as in FIG. 8a, whereby the piston element of the embodiment of the device in accordance with FIG. 1, starting from its first end position is moved in the direction of its second end position but has not reached the second end position.
Figure 8C:
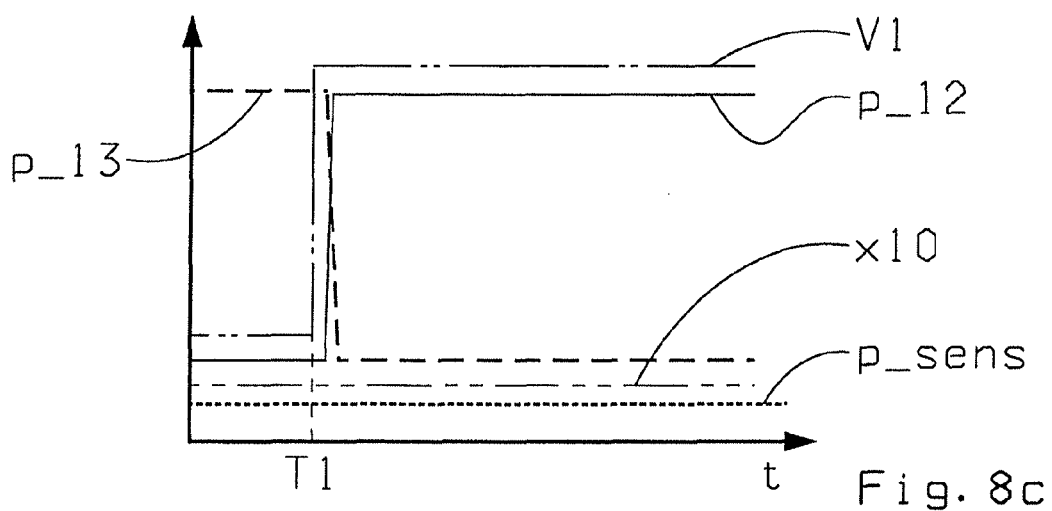
FIG. 8c a presentation as in FIG. 8a during an operating condition trend of the device in accordance with FIG. 1, during which the piston element, starting from its first end position shall be moved in the direction of its second end position as requested, but the movement of the piston element does not take place.

FIG. 8a to FIG. 8c shows several trends of operating conditions over time t which occur during actuation of the piston elements 10 of the adjusting device 2 of device 1, in accordance with FIG. 1, beginning at its first end position into the direction of its second end position during different trends of operating conditions of device 1.

In the presentation in accordance with FIG. 8a and based on the trend of the operating condition, the time point T1 shows a request for a gear ratio change in the transmission device, in which the shift element 4, via the shifting of the piston element 10, needs to be changed into an engaged operating condition. Due to the shift request, a trend V1 changes instantly at the time point T1. At almost the same time, the hydraulic pressure p_12 in the piston chamber 12 increases instantly and the piston element 10 is moved, beginning at its first end position in the direction of its second end position. The trend x10 of the actuating distance x of the piston element 10 changes in a manner as is presented in FIG. 8a. Simultaneously with the increase of the hydraulic pressure p_12 in the piston chamber 12, the hydraulic pressure p_13 in the piston chamber 13 falls to the level of the hydraulic pressure p_12 in the piston chamber 12 because, due to the piston movement of the piston element 10, the throttle device 16, through lifting of the sealing device 32, is released from the cylinder wall 31, and the piston chambers 12 and 13 are connected with each other via the throttle device 16.

Due to the counter pressure p_sens which occurs in the area of the hydraulic storage 27 and the throttling device 21, the hydraulic pressure p_12 rises, as well as the hydraulic pressure p_13 in the chamber 12 or 13, respectively, as shown in the manner in FIG. 8a up to a time point T2, at which the piston element 10 reaches a second end position. Then, the throttle device 16 of the piston element 10 is, through connection of the sealing device 30 at the cylinder wall 31, blocked and the piston chambers 12 and 13 are separated from each other. For that reason the pressure p_12 in the piston chamber 12 rises instantly again at the time point T2, while the pressure p_13 in the piston chamber 13 rises initially at a large gradient and thereafter, up to a time point T3 diminishes in a flat gradient and further diminishes via a pressure ramp. The flat pressure ramp is a result from the fact that the hydraulic storage 27, at a blocked throttle device 16, pushes back the store hydraulic fluid through the spring force of the spring device 28 in to the pipe system of the device 1. At the time point T3, the hydraulic storage 27 is completely empty and where the pressure p_13 drops instantly to a pre-filling pressure.

The trend of the sensor pressure or the pressure p_sens, respectively, which is established in the area of the pressure measuring device 22 is also shown in FIG. 8a, wherein the pressure p_sens, in the area of the pressure measuring device 22, initially immediately increases at the time point T1 and thereafter follows the pressure p_13 of the piston chamber 13 and again diminishes at the time point T3 to the value of time point T1.

In the operating condition trend which is the basis of FIG. 8b, the piston element 10, in accordance with a respective request, is moved in a manner as illustrated in FIG. 8b initially beginning at its first end position in the direction of its second end position and starting at the time point T1. At a time point T4, the piston element 10 is not further moved in the direction of its second end position and remains in an interim position between the two end positions. Thus, the throttle device 16 is not closed in the previously described manner and a continuous leakage flow is present in the area of the throttle device 16, starting from the piston chamber 12 into the direction of the piston chamber 13. Due to the standstill of the piston element 10 at the time point T4, the pressure p_13 in the piston chamber 13 drops initially immediately and is then, along a flat pressure ramp, brought to a low pressure level at a time point T5.

The pressure ramp which establishes itself between the time points T5 and T4 is a result again due to the movement of the already stored hydraulic fluid volume in the area of the hydraulic storage 27, which is again not completely emptied at the time point T5. At the time when the hydraulic storage 27 or rather at the time point T5, is emptied the hydraulic pressure p_13 in the piston chamber 13 is diminishing again instantly to a lower level which adjusts itself due to the hydraulic fluid volume flow via the throttle device 16, beginning at the piston chamber 12 in the direction of the piston chamber 13. The sensor pressure p_sense is equal at the time point T5 to the pressure p_13 of the piston chamber 13 and is above the pressure level of the sensor pressure p_sens at the time T1, through which it is recognized that, in the area of the pressure measuring device 22, the intended end position of the piston element 10 of the adjusting device 2 has not been reached.

Due to the error detection at the time point T5, necessary substitution activities are again initiated, such as for instance a reduction of the drive control of the piston element 10.

In the operation condition trend, which is the basis of FIG. 8c, despite a respective request, the piston element 10 is not moved from its first end position in the direction of its second end position, which causes no change in the trend of sensor pressure p_sens. From the even trend of the sensor pressure p_sens, it can be diagnosed that either an error occurred in the area of the piston element 10 or in a drive control device for the piston element 10, and respective substitution activities have to be initiated.

Figure 9A:
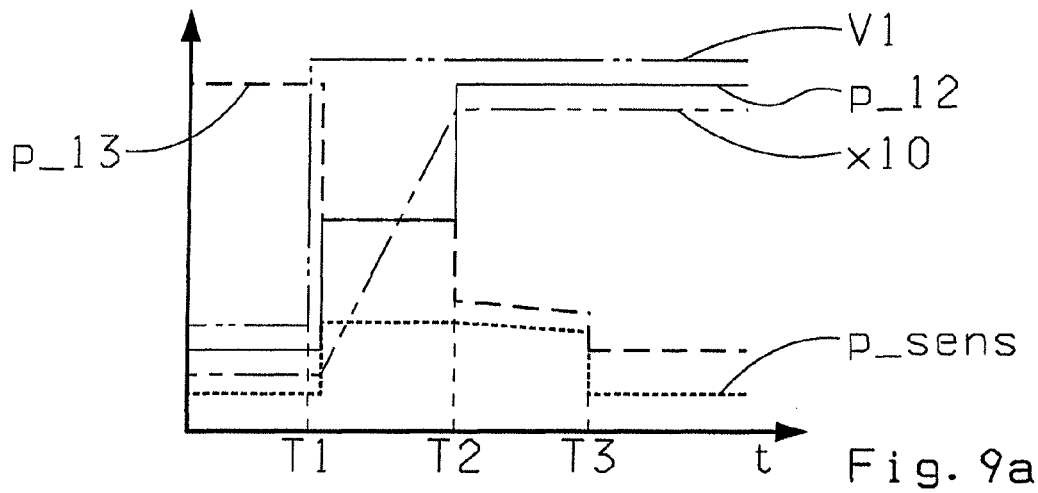
FIG. 9a a presentation, as in FIG. 8a, of several trends of different operating condition parameters of the device in accordance with FIG. 3.

The presentation in accordance with FIG. 9a is based on the described operating condition trend in FIG. 8a of the device 1 in accordance with FIG. 3, wherein the diagnostic pressure or sensor pressure p_sens in the area of the pressure measuring device 22 at the time point T1 and the onset of movement of the piston element 10 suddenly increases. After the requested end position of the piston element 10 is reached, the throttle device 16 will be closed in the previously described manner and the sensor pressure p_sens falls again suddenly. Due to the sensor signal p_22 which is timely limited, the onset of movement of the piston element 10 and also the reaching of the intended end position is recognized and a proper function is verified.

Figure 9B:
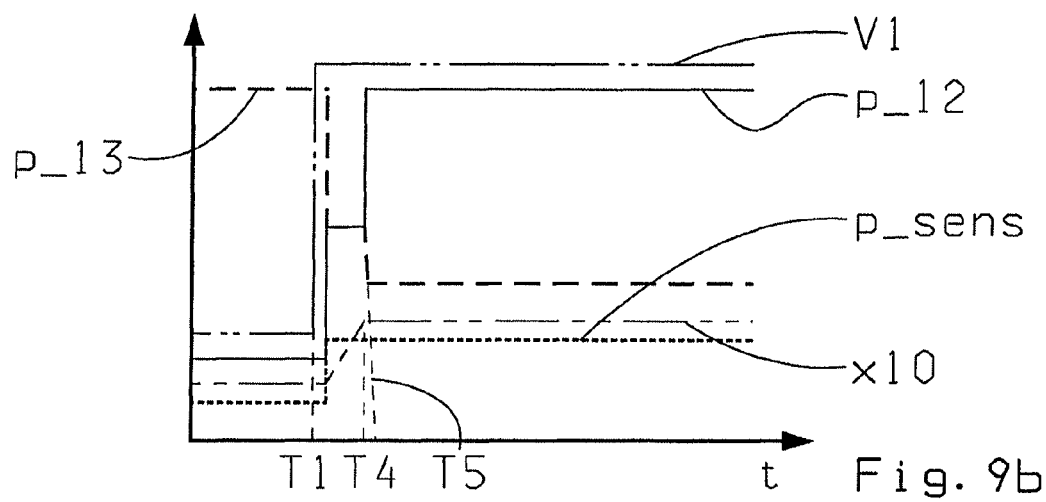
FIG. 9b a presentation as in FIG. 8b which concerns the device in accordance with FIG. 3.

The operating condition trend, which is the basis of the presentation in FIG. 9b, corresponds with the operating condition trend as described in FIG. 8b, in which the actuation element 10 does not reach the intended or rather, requested end position. Due to the permanently present sensor signal p_sens, at the time point T1, it is identified in the area of the electric transmission control device that the actuation element 10 is not positioned in the requested functional window and respective substitution activities, such as the withdrawal of the drive control of the adjusting device 2, are initiated.

Figure 9C:
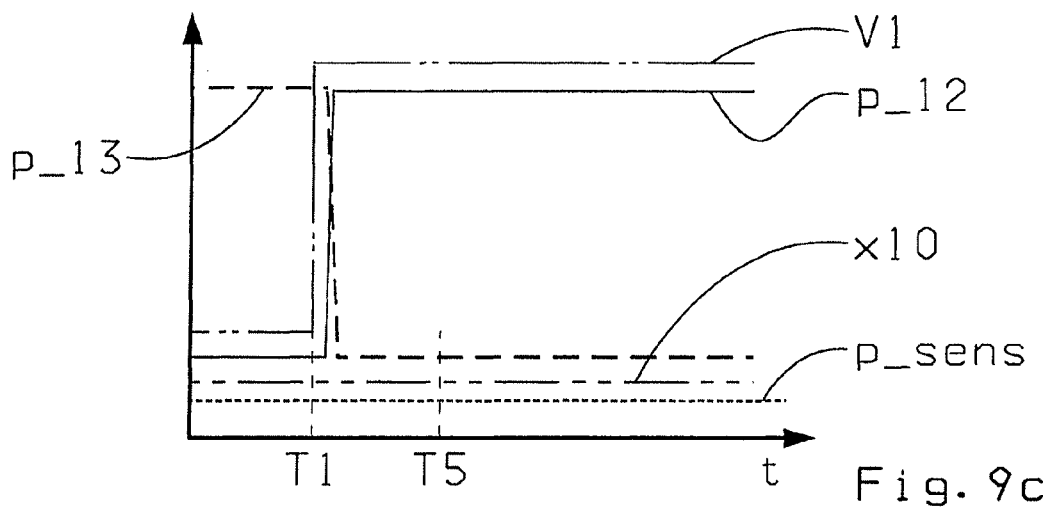
FIG. 9c a presentation as in FIG. 8c which concerns the device in accordance with FIG. 3.

The operating condition trend, as presented in accordance with FIG. 9c, corresponds mainly with the operating condition trend as described in FIG. 8c, in which the actuation element 10 is not at all moved from its end position into the direction of the requested end position. Due to the consistent sensor pressure p_sens, a faulty operating condition, in the area of the electric transmission control device, is identified in the area of the piston element 10 or in a drive control device of the piston element 10, and respective substitution activities are initiated.

Figure 10A:
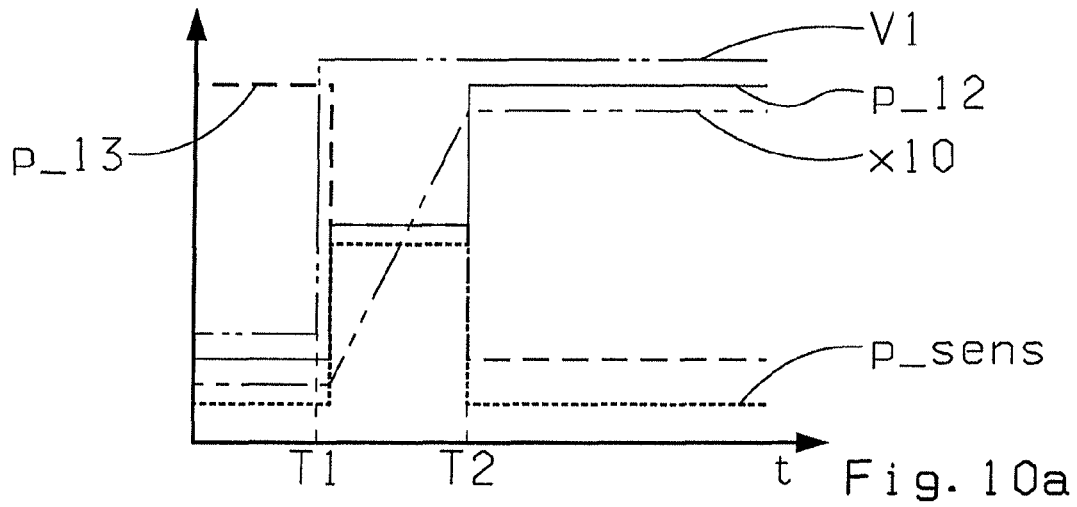
FIG. 10a a presentation as in FIG. 8a during an operating condition trend of the device in accordance with FIG. 4, in which the piston element of an adjusting device, starting from a first end position is completely moved into a second end position.
Figure 10B:
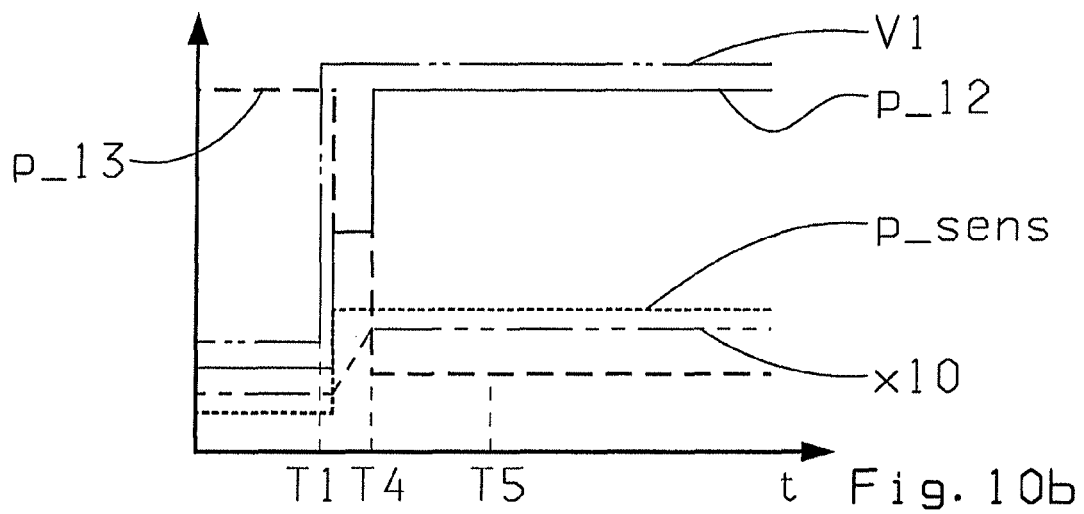
FIG. 10b a presentation as in FIG. 8b which concerns the device in accordance with FIG. 4.
Figure 10C:
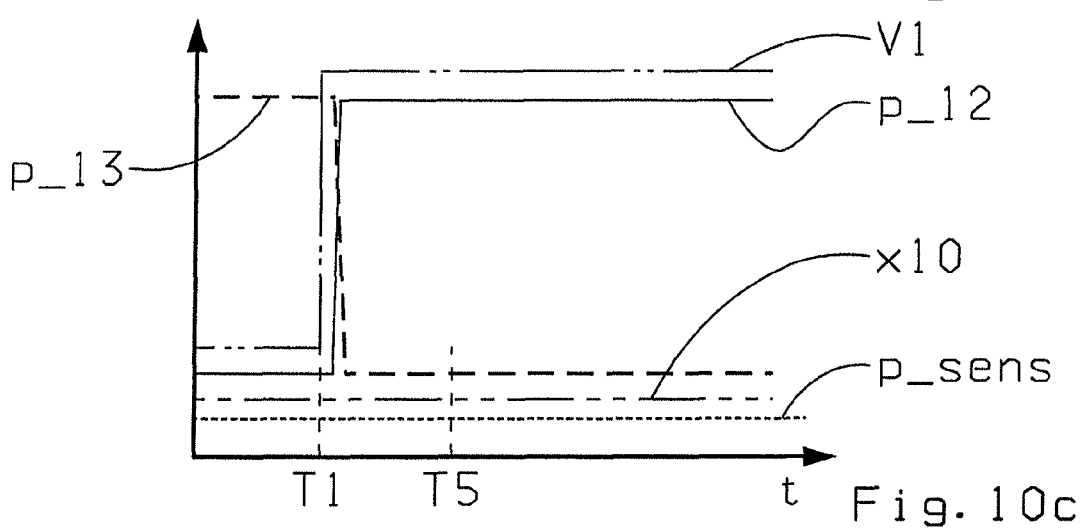
FIG. 10c a presentation as in FIG. 8c which concerns the device in accordance with FIG. 4.

The operating condition trend, in accordance with the presentation in FIG. 10a, also corresponds with the described operating condition trend in FIG. 8a of the device 1 in accordance with FIG. 4, while the operating condition trend in accordance with FIG. 10b corresponds with the one in FIG. 8b, and the operating condition trend in FIG. 10c corresponds with the described operating condition trend in FIG. 8c.

At the time point T1, the pressure p_12 rises immediately in the piston chamber 12 in the manner as presented in FIG. 10a, and falls immediately at the time point T2, because the piston element 10, at the time point T2, has reached its intended end position and the throttle device 16 is again blocked. Up to the time point T3, the hydraulic fluid which is stored in the area of the hydraulic storage 27 is again released, whereby the hydraulic storage 27 is completely emptied at the time point T3. Due to the time limited presence of the sensor signal p_sens, the beginning of the movement of the piston element 10 and also the reaching of the intended end position is diagnosed.

Due to the permanently present sensor signal p_sens in FIG. 10b, it is again recognized in the area of the electronic transmission control device that the piston element 10 is not positioned in the requested functional window and defined substitution activities are initiated, such as a withdrawal of the drive control of the piston element 10.

In FIG. 10c, again no change of the sensor signal p_sense is shown, and the electronic transmission control device assumes, either in the area of the piston element 10 or in a drive control device of the piston element 10, a faulty function and respective substitution activities are initiated.

The hydraulic storage 27 of the device 1 in accordance with FIG. 1, or FIG. 4, respectively, is especially an advantage if the adjustment time of the piston element 10 of the adjusting device 2, or the piston element 11 of the adjusting device 3, is so short between the end positions of the piston elements 10 or 11, respectively, that even at a complete movement of the piston elements 10 or 11, respectively, its perfect actuation cannot be verified for sure. This is for instance the case when the sample rate of the electric transmission control device is longer than the actuation time or positioning time, respectively, of the piston element 10 or 11, respectively.

After reaching the intended end position and the present release of a hydraulic fluid volume from the hydraulic storage 27 into the pipe system of the device 1, the sensor signal p_sens, after reaching the intended end position of the piston elements 10 or 11, respectively, is still above the pressure level in the area of the pressure measuring device 22 at the time point T1, therefore the recognition time is increased without an extension of the actuation time of the shifting element 4.

The adjustment speed of the piston element 10 or 11, respectively is mainly determined by the available actuation pressure p_sys of the high-pressure area 34 and the maximum possible volume flow. Hereby, the flow resistance of the intake, the return of the adjusting device 2 or rather 3 and the additional throttle device 21 and its tank pipe, have to be kept at a minimum. Since the tank pipe, in the area of the throttling baffle or the additional throttle device 21, respectively, needs to be heavily throttled, the tank pipe to the throttling baffle 21 is complemented through two different hydraulic systems, which allow on one side a diagnosable pressure threshold, as well as fast activation dynamics.

Due to the large, possible pressure threshold, the device 1 in accordance with FIG. 1 can be used to simultaneously monitor several actuating systems or adjusting devices 2 and 3 and can differentiate them, because different pressure levels can be accomplished in the tank pipe of the additional throttle device 21, due to different size leakage screens in the area of the throttle device 16 and 17. For a differentiation, the pressure measuring device 22 needs to be designed as a pressure sensor, whereby the diagnosable pressure level is dependent on the system pressure p_sys or the actuating pressure of the actuated pressure site of the adjusting device 2 or 3, respectively, as described in the manner in FIG. 5.

REFERENCE CHARACTERS

1. Device
2. Adjusting Device
3. Adjusting Device
4. Shifting Element
5. Shifting Element
6. Active Surface
7. Active Surface
8. Active Surface
9. Active Surface
10. Piston Element
11. Piston Element
12. Piston Chamber
13. Piston Chamber
14. Piston Chamber
15. Piston Chamber
16. Throttle Device
17. Throttle Device
18. Low Pressure Area
19. Valve Device
20. Valve Device
21. Additional Throttle Device, Throttling baffle
22. Pressure Measuring Device
23. Electro-hydraulic Actuator
24. Electro-hydraulic Actuator
25. Spring Device
26. Spring Device
27. Hydraulic Storage
28. Spring Device
29. Throttle Bore Hole
30. Sealing Device
31. Cylinder Wall
32. Sealing Device
33. Pressure Limiting Valve
34. High Pressure Area
35. Screen
36. Screen
A_21 Throttle Section Cut of the Jamming Screen
K1 to K4 Characteristic Curve
Q2, Q3 Trend Hydraulic Fluid Volume Flow
p_12 Hydraulic Pressure
p_13 Hydraulic Pressure
p_DBV Trigger Pressure of the Pressure Limiting Valve
p_sens Jamming Pressure, Sensor Pressure
p_sens_schwell Pressure Threshold
p_sens_schwell_2 Pressure Threshold
p_sens_schwell_3 Pressure Threshold
p_sys Hydraulic Pressure of the High Pressure Area
p_sys_1 Pressure Value
p_VS23 Control Pressure
p_VS24 Control Pressure
t Time
T1 to T5 Discrete Time Point
V1 Characteristic Curve
x Actuating Distance
x1 Travel Value
x2 Travel Value
x10 Trend of the Travel of the Piston 10

The invention claimed is:

1. A device (1) for determining an operating state of at least one bi-directionally actuable hydraulic adjusting device (2, 3) of a shifting element (4, 5) of a transmission device, which are pressurized with hydraulic pressure (p_12, p_13) in areas of first and second active surfaces (6, 7, 8, 9) of a piston element (11, 12),
wherein at the piston element (10 or 11), when a hydraulic pressure (p_sys) of a high-pressure area (34) is present in the area of the first active surface (6 or 8), an acting force component works in a direction of a first end position of the piston element (10 or 11), and, when the hydraulic pressure (p_sys) of the high-pressure area (34) is present in the area of the second active surface (7 or 9), an acting force component works in a direction of a second end position of the piston element (10 or 11),
the areas (12 to 15) of the adjusting device (2, 3) which are pressurizable and which are assigned to the first and the second active surfaces (6 to 9) of the piston element (10, 11), in positions of the piston element (10 or 11), between the first and the second end positions, are connected with one another via a throttle device (16, 17) and one of the areas (12 or 14) is connectable, for the adjustment of the piston element (10 or 11), with the high-pressure area (34) and the other area (13 or 15) is connectable with a lower pressure area (18),
an additional throttle device (21) is provided upstream of the lower pressure area (18), and a pressure measuring device (22) is provided upstream of the additional throttle device (21).

2. The device according to claim 1, wherein a valve device (19, 20) is positioned between the areas (12 to 15) of the adjusting device (2, 3) and the high-pressure and the lower pressure areas (34, 18).

3. The device according to claim 2, wherein the valve device (19, 20) is pressurizable, via an electro-hydraulic actuator (23, 24) and against a spring device (25, 26), with a control pressure (p_VS23, p_VS24).

4. The device according to claim 2, wherein the valve device (19, 20) is a 4/2-way valve.

5. The device according to claim 1, wherein a hydraulic storage (27) is provided upstream of the additional throttle device (21).

6. The device according to claim 5, wherein the hydraulic storage (27) is completely filled, when the pressure measuring device (22) identifies a faulty function in the area of the adjusting device (2, 3) by detecting a pressure below a predefined pressure threshold (p_sens).

7. The device according to claim 5, wherein a storage volume of the hydraulic storage (27) is equal at least to a hydraulic fluid volume which is displaced during movement of the piston element (10, 11) from one of the first and the second end positions to the other of the first and the second end positions.

8. The device according to claim 1, wherein a pressure limiting valve (33) is positioned upstream of the additional throttle device (21), and the pressure limiting valve (33) has a trigger pressure (p_DBV) that corresponds with a predefined pressure threshold (p_sens_thresh) at which the pressure measuring device (22) identifies a faulty function in the area of the adjusting device (2, 3).

9. The device according to claim 1, wherein the electrohydraulic actuator is in an operating connection with the high-pressure area (34).

10. The device according to claim 1, wherein at least an additional adjusting device (3) of an additional shifting element (5) is operationally connectable, via an additional valve device (20), with the high-pressure area (34), and upstream of the additional throttle device (21) and the pressure measuring device (22), with the lower pressure area (18).

11. The device according to claim 10, wherein the additional adjusting device (3) is pressurizable with hydraulic pressure in areas of first and second surfaces (8, 9) of an additional piston element (11), whereby at the additional piston element (11), when a hydraulic pressure (p_sys) of the high-pressure area (34) is present in the area of the first active surface (8) of the additional piston element (11), an acting force component works in a direction of a first end position of the additional piston element (11), and when a hydraulic pressure (p_sys) of the high-pressure area (34) is present in the area of the second active surface (9) of the additional piston element (11), an acting force component works in a direction of a second end position of the additional piston element (11).

12. The device according to claim 11, wherein areas (14, 15) of the additional adjusting device (3) of the additional shifting element (5) and the active surfaces (8, 9) of the additional piston element (11) which are pressurizable with hydraulic pressure, are connected with each other in positions of the additional piston element (11), between the first and the second end positions, via an additional throttle device (17) and that one of the areas (14 or 15) of the additional adjusting device (3) is connectable, for the adjustment of the additional piston element (11), with the high-pressure area (34) and the other area (15 or 14) is connectable with the low lower pressure area (18), whereby upstream of the low lower pressure area (18) the additional throttle device (21) is provided and again upstream of the additional throttle device (21), the pressure measuring device (22) is provided.

13. The device according to claim 10, wherein a throttle cross section of the throttle device (16) assigned to shifting element (4), and a throttle cross section of the additional throttle device (17) of the additional shifting element (5) deviate from one another.

14. A device (1) for determining an operating state of a bi-directionally actuable hydraulic adjusting device (2, 3) which is coupled to a shifting element (4, 5) of a transmission device,
wherein a piston element (10, 11) divides an interior of the hydraulic adjusting device (2, 3) into an area defined by a first active surface of the piston element (10, 11) and an area defined by a second active surface of the piston element (10, 11),
the piston element (10, 11) is axially slidable to a first axial end position when the area defined by the first active surface of the piston element (10, 11) is pressurized with hydraulic pressure (p_sys) of a high-pressure area (34), and the piston element (10, 11) is axially slidable to a second axial end position when the area defined by the second active surface of the piston element (10, 11) is pressurized with the hydraulic pressure (p_sys) of the high-pressure area (34),
a throttle device (16, 17) interconnects the areas defined by the first and the second active surfaces of the piston element (10, 11) when the piston element (10, 11) is positioned between the first and the second axial end positions;
the area defined by the first active surface of the piston element (10, 11) is connectable with the high-pressure area (34) and the area defined by the second active surface of the piston element (10, 11) is connectable with a lower pressure area (18); and
an additional throttle device (21) is provided upstream of the lower pressure area (18), and a pressure measuring device (22) is provided upstream of the additional throttle device (21).

* * * * *